(12) United States Patent
Tse et al.

(10) Patent No.: US 9,387,991 B2
(45) Date of Patent: Jul. 12, 2016

(54) APPARATUS AND METHOD FOR ARRANGING INTEGRATED CIRCUIT RECEIVING TUBES

(71) Applicants: Wang Lung Tse, North Point (HK); Chun Shing Wong, Kwai Chung (HK); Cho Wai Leung, Kwai Chung (HK); Ka Wing Yeung, Kwai Chung (HK)

(72) Inventors: Wang Lung Tse, North Point (HK); Chun Shing Wong, Kwai Chung (HK); Cho Wai Leung, Kwai Chung (HK); Ka Wing Yeung, Kwai Chung (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 7 days.

(21) Appl. No.: 14/511,720

(22) Filed: Oct. 10, 2014

(65) Prior Publication Data
US 2016/0101945 A1      Apr. 14, 2016

(51) Int. Cl.
*B65G 47/24* (2006.01)
*B65G 47/04* (2006.01)

(52) U.S. Cl.
CPC ............... *B65G 47/24* (2013.01); *B65G 47/04* (2013.01); *B65G 2201/0276* (2013.01); *B65G 2203/0225* (2013.01)

(58) Field of Classification Search
CPC ..... B65G 47/24; B65G 47/252; B65G 47/256
USPC ......................................... 198/398, 399, 401
See application file for complete search history.

(56) References Cited

U.S. PATENT DOCUMENTS

| | | | | |
|---|---|---|---|---|
| 3,447,662 | A * | 6/1969 | House | B65B 35/56 198/388 |
| 3,537,567 | A * | 11/1970 | Nowicki | B65G 47/256 193/45 |
| 4,261,680 | A * | 4/1981 | Carnley | B65G 47/24 198/376 |
| 4,777,907 | A * | 10/1988 | Sanger | G01N 35/00029 198/399 |
| 5,298,425 | A * | 3/1994 | Kuhn | B65G 47/1407 198/399 |
| 6,276,512 | B1 * | 8/2001 | Geerke | B65G 47/256 198/395 |

FOREIGN PATENT DOCUMENTS

CN      202816894      3/2013

* cited by examiner

Primary Examiner — James R Bidwell
(74) *Attorney, Agent, or Firm* — Ostrolenk Faber LLP

(57) ABSTRACT

An apparatus for arranging integrated circuit receiving tubes, the apparatus including a reverse mechanism, a detection element and a discharge mechanism. In use, the reverse mechanism receives a tube and the detection element determines an orientation of the received tube. The reverse mechanism moves to allow the discharge mechanism to receive the tube from itself. If the orientation of the received tube differs from a desired orientation, the movement of the reverse mechanism changes the orientation of the tube before allowing the discharge mechanism to receive the tube. Otherwise, the orientation of the tube is maintained notwithstanding the movement of the reverse mechanism, and is subsequently received by the discharge mechanism. This helps to automatically ensure that all the tubes are received by the discharge mechanism in the same orientation.

14 Claims, 3 Drawing Sheets

APPARATUS AND METHOD FOR ARRANGING INTEGRATED CIRCUIT RECEIVING TUBES

FIELD OF THE INVENTION

The present invention relates to an apparatus and method for arranging tubes configured to receive integrated circuit packages (i.e. integrated circuit receiving tubes).

BACKGROUND OF THE INVENTION

Integrated circuit receiving tubes are often used for the shipping and handling of integrated circuit packages to protect the integrated circuit packages from damage. To date, there are many different types of receiving tubes with different cross-sectional shapes. For example, one common type of receiving tubes has a U-shaped cross-section formed by a protrusion extending along the length of one of its sides and protruding towards the interior of the tube. The protrusion helps to urge the integrated circuit packages against the tube so as to store a plurality of integrated circuit packages along the tube's length.

To maximize packing efficiency, it is good to ensure that the receiving tubes are oriented in the same direction when packing the receiving tubes into respective containers. For instance, the receiving tubes with the U-shaped cross-sections are preferably packed such that the sides with the protrusions face the same direction. This can be achieved manually but manual packing is labour-intensive and is prone to errors.

CN202816894 describes an automatic tube arranging mechanism for arranging integrated circuit receiving tubes. In this prior art, the tube arranging mechanism comprises a separating mechanism, a reverse mechanism provided with a block at its lowest point position, a detection unit and a discharge mechanism. In operation, the separating mechanism receives a single tube and rotates to pass this tube to the reverse mechanism. The detection unit detects the orientation of the tube received by the separating mechanism. If this orientation is the desired orientation, the block of the reverse mechanism moves to allow the tube received by the reverse mechanism to pass through to the discharge mechanism which will then place the tube onto a collecting plate. On the other hand, if the detected orientation is not the desired orientation, the block of the reverse mechanism is kept in place until the reverse mechanism rotates the tube to the desired orientation. After this rotation, the block then moves to allow the tube to pass through to the discharge mechanism.

The prior art tube arranging mechanism described above enables the tube arranging process to be automatic, thereby raising tube arranging efficiency, saving manpower resources and reducing occurrences of equipment accidents and damages to the integrated circuit products. However, this mechanism comprises several components and the cycle time for arranging tubes is rather long.

SUMMARY OF THE INVENTION

The present invention aims to provide a new and useful apparatus for arranging integrated circuit receiving tubes.

In general terms, the present invention proposes an apparatus comprising a reverse mechanism and a discharge mechanism. The apparatus uses the positioning of the reverse mechanism with respect to the discharge mechanism to either allow the discharge mechanism to receive a tube or prevent the discharge mechanism from receiving the tube until the reverse mechanism changes the orientation of the tube.

Specifically, a first aspect of the present invention is an apparatus for arranging tubes configured to receive integrated circuit packages, the apparatus comprising: a reverse mechanism configured to receive a tube; a detection element configured to determine an orientation of the tube received by the reverse mechanism; and a discharge mechanism, the reverse mechanism being movable selectively between a first position which prevents the discharge mechanism from receiving the tube from the reverse mechanism and a second position which allows the discharge mechanism to receive the tube; wherein the movement of the reverse mechanism between the first position and the second position is dependent on the determined orientation of the tube.

With the above-mentioned apparatus, if the determined orientation of the tube differs from a desired orientation, the movement of the reverse mechanism can change the orientation of the tube before allowing the discharge mechanism to receive the tube. This enables the tubes to be arranged in the same orientation in an automatic manner while using fewer components than prior art apparatuses. Thus, the cycle time of arranging the tubes can be reduced.

The apparatus may further comprise a separation mechanism configured to ensure the receiving of a single tube by the reverse mechanism. Ensuring that the reverse mechanism receives a single tube each time helps to smooth the process, allowing the tubes to be arranged on the collecting plate in a more organized and efficient manner. For example, the separation mechanism may comprise at least one groove sized to receive a single tube.

The apparatus may further comprise an urging mechanism configured such that when a plurality of tubes are received by the at least one groove of the separation mechanism, the urging mechanism repeatedly urges the plurality of tubes away from the at least one groove until a single tube is received by the at least one groove. This helps to increase the efficiency at which the single tube is separated from the rest of the tubes.

The apparatus may further comprise a tube present detection device configured to detect if a tube has been received by the at least one groove. Preferably, the detection element is configured to determine the orientation of the tube received by the at least one groove of the separation mechanism after the tube present detection device has detected that a tube has been received. This helps to increase the accuracy of the orientation determined by the detection element.

The apparatus may further comprise a reject mechanism configured to urge the tube out of the at least one groove if the detection element is unable to detect the orientation of the tube after the tube present detection device has detected that a tube has been received. This helps to further increase the accuracy of the orientation determined by the detection element.

The separation mechanism and the reverse mechanism may be separate and in this embodiment, the separation mechanism is movable to allow the reverse mechanism to receive the single tube from the separation mechanism. Having the separation mechanism as a separate component from the reverse mechanism helps to increase the efficiency of the apparatus as the separation mechanism and the reverse mechanism can perform their respective tasks separately and simultaneously.

The separation mechanism may alternatively be comprised in the reverse mechanism and this helps to further reduce the components in the apparatus.

The reverse mechanism and the discharge mechanism may comprise respective grooves for receiving the tube with these grooves misaligned when the reverse mechanism is in the first position and aligned when the reverse mechanism is in the second position. This eliminates the need for a blocking mechanism as the misalignment can be used to prevent the discharge mechanism from receiving the tube when the tube orientation is not the desired orientation. This in turn helps to reduce the number of components required in the apparatus.

The reverse mechanism may be rotatable, wherein rotation of the reverse mechanism in one direction from the first position to the second position maintains the orientation of the tube and rotation of the reverse mechanism in the other direction from the first position to the second position changes the orientation of the tube. The rotation of the reverse mechanism can thus serve two purposes—(i) allowing the discharge mechanism to receive the tube from the reverse mechanism and (ii) changing the orientation of the tube when necessary.

In one specific example, the reverse mechanism is configured to rotate 45 degrees in the clockwise direction to maintain the orientation of the tube and 135 degrees in the anti-clockwise direction to change the orientation of the tube. It should, of course, be appreciated that other angles may also be equally applicable.

The apparatus may further comprise tube grooves configured to facilitate movement of the tube from the reverse mechanism to the discharge mechanism. These tube grooves can help guide the tube from the reverse mechanism to the discharge mechanism.

The apparatus may further comprise support structures with V-shaped openings and this helps to facilitate the receiving of the tubes by the apparatus.

A second aspect of the present invention is a method for arranging tubes configured to receive integrated circuit packages, the method comprising: receiving a tube with a reverse mechanism; determining an orientation of the received tube; moving the reverse mechanism selectively between a first position which prevents receiving of the tube from the reverse mechanism and a second position which allows receiving of the tube from the reverse mechanism; wherein the movement of the reverse mechanism between the first position and the second position is dependent on the determined orientation of the tube.

BRIEF DESCRIPTION OF THE FIGURES

An embodiment of the invention will now be illustrated for the sake of example only with reference to the following drawings, in which.

DETAILED DESCRIPTION OF THE EMBODIMENTS

Figure 1:
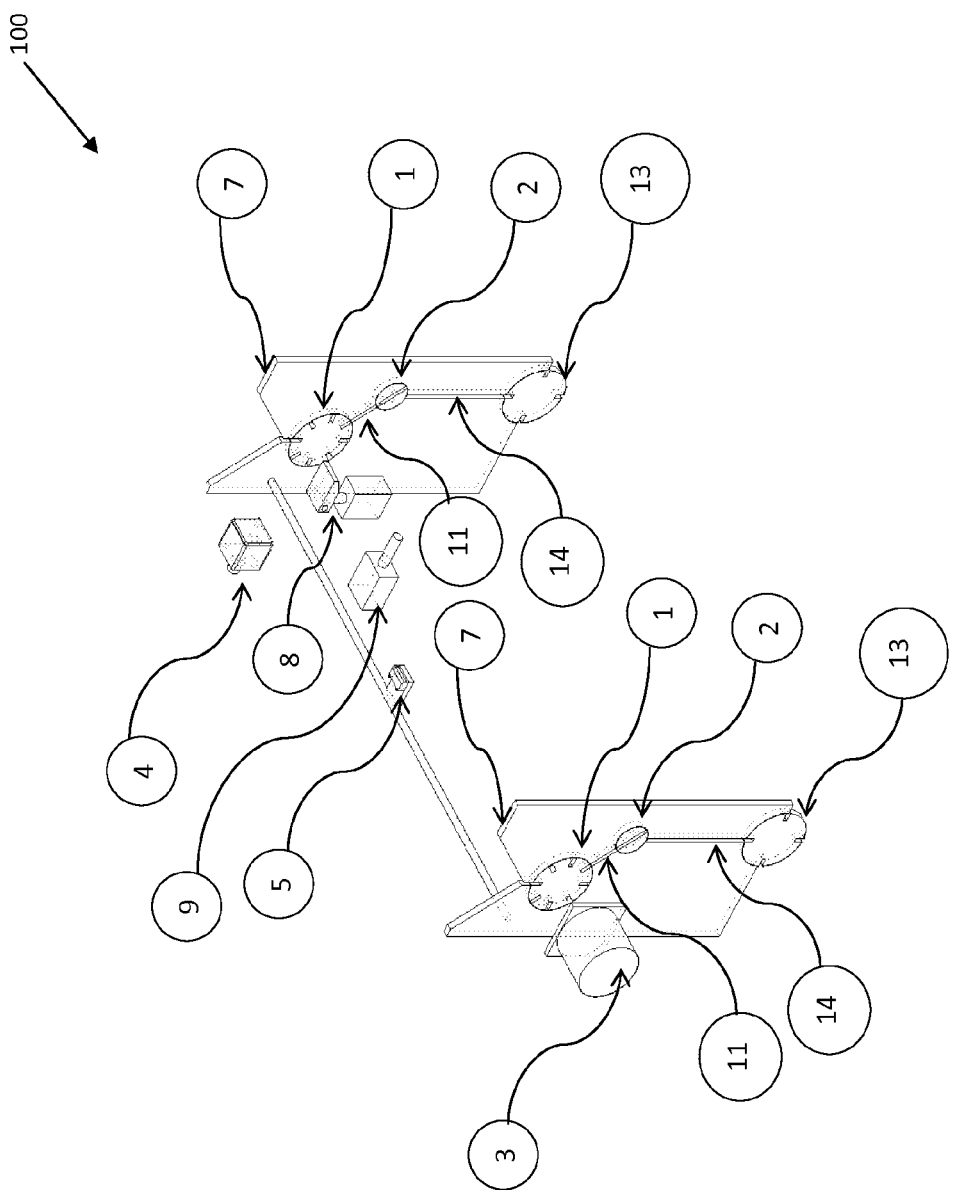
FIG. 1 shows a perspective view of an apparatus for arranging integrated circuit receiving tubes according to an embodiment of the present invention.

FIG. 1 shows a perspective view of an apparatus 100 for arranging integrated circuit receiving tubes according to an embodiment of the present invention.

As shown in FIG. 1, the apparatus 100 comprises two elongate support structures 7 arranged parallel to each other. Each support structure 7 comprises an inner side facing the other support structure 7 and an outer side opposite to the inner side. A V-shaped tube buffer in the form of a V-shaped opening is located at the top edge of each support structure 7. The V-shaped openings of the support structures 7 cooperate with each other to receive the integrated circuit receiving tubes.

The apparatus 100 further comprises a separation mechanism which includes two separation wheels 1, a reverse mechanism having two reverse wheels 2 and a discharge mechanism having two discharge wheels 13. The separation mechanism is configured to ensure the receiving of a single tube by the reverse mechanism.

Each support structure 7 includes a separation wheel 1, a reverse wheel 2 and a discharge wheel 13 attached to its inner side. The separation wheel 1 is arranged directly below the V-shaped opening of the support structure 7, more specifically, at the exit of the V-shaped opening to receive tubes from the V-shaped opening. The reverse wheel 2 is located below the separation wheel 1 and a first tube groove 11 extends from a circumference of the separation wheel 1 to a circumference of the reverse wheel 2. Further, the reverse wheel 2 is displaced to one side of the support structure 7 such that the first tube groove 11 is inclined at an angle with respect to the (vertical) longitudinal axis of the support structure 7. The discharge wheel 13 is arranged directly below the reverse wheel 2 with a second tube groove 14 extending from a circumference of the reverse wheel 2 to a circumference of the discharge wheel 13.

Each separation wheel 1 is rotatable and has a total of eight grooves, each sized to receive a single tube. The grooves on the separation wheels 1 are arranged such that for each separation wheel 1, when one of its grooves is aligned with the V-shaped opening of the support structure 7, a different one of its grooves is aligned with the first tube groove 11. The alignment of the grooves with the V-shaped openings allows the grooves of the separation wheels 1 to receive a tube from the V-shaped openings whereas the alignment of the grooves with the first tube grooves 11 allows the first tube grooves 11 to receive a tube from the grooves of the separation wheels 1.

Each reverse wheel 2 is rotatable between a first position and a second position, and comprises a groove extending through it. In the first position, the grooves extending through the reverse wheels 2 are aligned with respective first tube grooves 11 but are misaligned with the second tube grooves 14. In the second position, the grooves extending through the reverse wheels 2 are aligned with respective second tube grooves 14 but are misaligned with the first tube grooves 11. Thus, in the first position, the reverse wheels 2 can receive a tube from the first tube grooves 11 but the second tube grooves 14 are prevented from receiving a tube from the reverse wheels 2, whereas in the second position, the reverse wheels 2 are unable to receive a tube from the first tube grooves 11 but the second tube grooves 14 can receive a tube from the reverse wheels 2.

Each reverse wheel 2 is rotatable from the first position to the second position in two directions. More specifically, the reverse wheel 2 either rotates 45 degrees in the clockwise direction or 135 degrees in the anti-clockwise direction to move from the first position to the second position. The rotation of the reverse wheels 2 in the clockwise direction maintains the orientation of the tube received by them whereas the rotation of the reverse wheels 2 in the anti-clockwise direction changes the orientation of the tube before reaching the second position.

Each discharge wheel 13 comprises four grooves and is also rotatable to allow the alignment of one of its grooves with one of the second tube grooves 14. This alignment enables the discharge wheels 13 to receive, via their grooves, a tube from the second tube grooves 14. After receiving a tube, the discharge wheels 13 can further rotate to discharge the tube onto a collecting plate (not shown in FIG. 1).

To drive the separation wheels 1, reverse wheels 2 and discharge wheels 13, the apparatus 100 further comprises two driver devices 3, each configured to drive the wheels 1, 2, 13 at one of the support structures 7. Each driver device 3 is arranged on the outer side of the respective support structure 7 so as not to hinder the movement of the tubes through the wheels 1, 2, 13.

The apparatus 100 further comprises a shaft connected between the separation wheels 1. A tube present detection device 5 is located on the shaft so as to detect whether a tube has been received in the grooves of the separation wheels 1. A detection element in the form of a tube orientation detection device 4 is further arranged with one of the separation wheels 1 and is configured to determine the orientation of the tube received by the separation wheels 1. The tube orientation detection device 4 is configured to determine the orientation of the tube after the tube present detection device 5 has detected that a tube has been received An urging mechanism in the form of a linear up/down device 8 and a reject mechanism in the form of a linear reject device 9 are further installed on the separation wheel 1 having the tube orientation detection device 4. The linear up/down device 8 and the linear reject device 9 cooperate to ensure that only a single tube is received by the separation wheels 1 at any one time, and that this tube is properly located within the grooves of the separation wheels 1 such that its orientation can be correctly detected by the orientation detection device 4.

Figure 2:
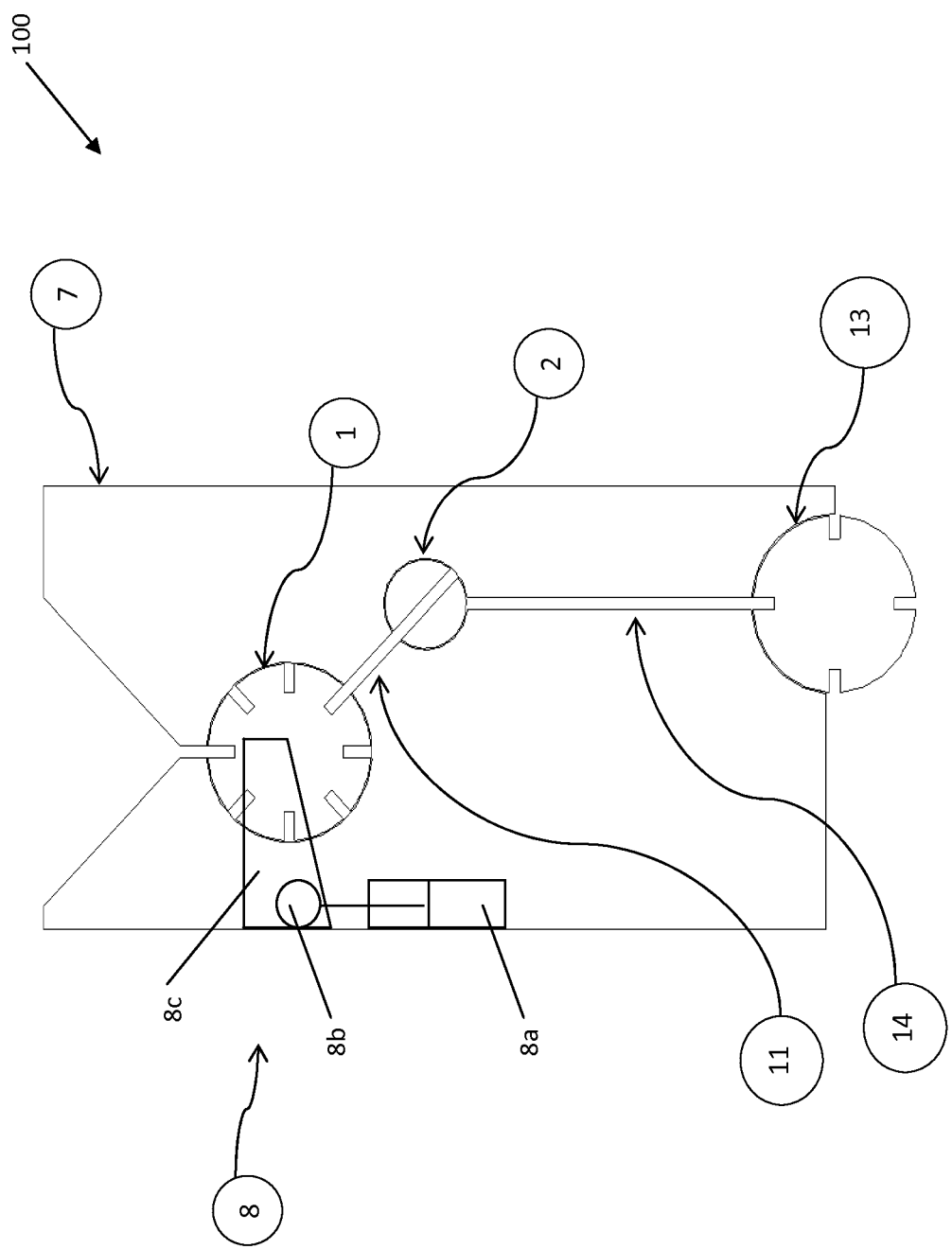
FIG. 2 shows a cross-sectional view of the apparatus of FIG. 1, with a focus on a linear up/down device of the apparatus.

FIG. 2 shows a cross-sectional view of the apparatus 100 with the linear up/down device 8. As shown in FIG. 2, the linear up/down device 8 comprises a driver element 8a connected to an actuator 8b which is in turn connected to an urging element 8c.

The driver element 8a serves to move the actuator 8b in a vertical motion, which in turn moves the urging element 8c vertically between a first position and a second position. In the first position, the urging element 8c lies just below the groove of the separation wheel 1 aligned with the V-shaped opening. In the second position, the urging element 8c lies alongside the groove. Hence, when a plurality of tubes are received by the groove of the separating wheel 1, by repeatedly moving the urging element 8c vertically between the first position and the second position, the urging element 8c can repeatedly urge the plurality of tubes away from the groove until only a single tube is received by the groove aligned with the V-shaped opening.

Figure 3:
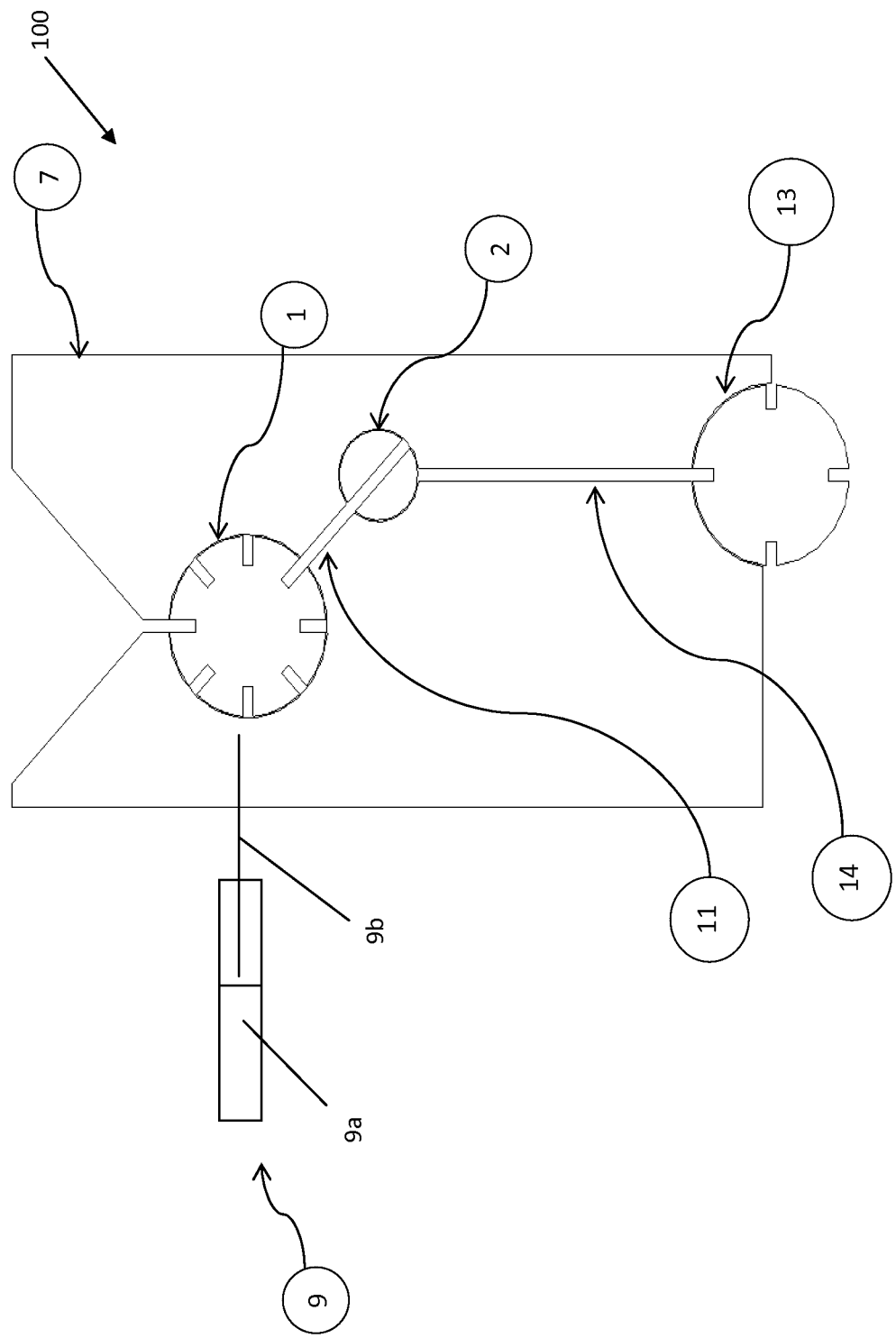
FIG. 3 shows a cross-sectional view of the apparatus of FIG. 1, with a focus on a linear reject device of the apparatus.

FIG. 3 shows a cross-sectional view of the apparatus 100 with the linear reject device 9. The linear reject device 9 comprises a driving unit 9a having a protruding element 9b connected therewith. When a tube is received in the grooves of the separation wheels 1 (as indicated by the tube present detection device 5) and the tube orientation detection device 4 is unable to detect the orientation of the tube, the driving unit 9a is configured to move the protruding element 9b to urge the tube out of the grooves of the separation wheels 1. In other words, the linear reject device 9 rejects the tube to allow the grooves to receive a further tube.

In use, a plurality of tubes are delivered to the V-shaped openings of the support structures 7, and the linear up/down device 8 and the linear reject device 9 work together to ensure that the separation wheels 1 properly receive a single tube in their grooves such that the tube orientation detection device 4 can detect the orientation of the received tube.

The driver device 3 then drives the separation wheels 1 to rotate to bring the grooves carrying the tube in alignment with the first tube grooves 11. At this point, the reverse wheels 2 are in the first position and thus, the grooves extending through the reverse wheels 2 are aligned with the first tube grooves 11. The first tube grooves 11 thus facilitate the movement of the tube from the separation wheels 1 to the reverse wheels 2, allowing the reverse wheels 2 to receive the tube. However, in this first position, the discharge wheels 13 are prevented from receiving the tube from the reverse wheels 2 as the grooves extending through the reverse wheels 2 are misaligned with the second tube grooves 14.

The reverse wheels 2 then move from the first position to the second position and this movement depends on the orientation of the tube detected by the tube orientation detection device 4. In particular, the reverse wheels 2 are driven by the driver device 3 to either rotate clockwise by 45 degrees or anti-clockwise by 135 degrees to move from the first position to the second position. If the tube is detected to be in the desired orientation, the reverse wheels 2 rotate clockwise by 45 degrees to the second position while maintaining the orientation of the tube received by them. Otherwise, if the detected orientation of the tube differs from the desired orientation, the reverse wheels 2 rotate anti-clockwise by 135 degrees, changing the orientation of the tube to the desired orientation before reaching the second position. Alternatively, the reverse wheels may also rotate in just one direction (i.e. clockwise or anti-clockwise), depending on the arrangement of the reverse wheels 2.

When the reverse mechanism is at the second position, the discharge mechanism is able to receive the tube from the reverse mechanism. More specifically, when the reverse mechanism is at the second position, the grooves extending through the reverse wheels 2 are aligned with the second tube grooves 14. Since a groove of each discharge wheel 13 is at this point, aligned with a respective second tube groove 14, the second tube grooves 14 facilitate the movement of the tube from the reverse wheels 2 to the discharge wheels 13, thus allowing the discharge wheels 13 to receive the tube in the desired orientation. After receiving the tube, the discharge wheels 13 are driven by the driver device 3 to rotate so as to discharge the tube onto a collecting plate.

Various modifications will be apparent to those skilled in the art.

For instance, the number of components may differ from that in the apparatus 100 shown in FIG. 1. One example of this is that there may be only one driver device 3 configured to drive the wheels 1, 2, 13 attached to both the support structures 7. There may also be only one reverse wheel 1 attached to one of the support structures 7. Further, the detection element may contain more than one tube orientation detection device 4. Similarly, there may be more than one tube present detection device 5, linear up/down device 8 and/or linear reject device 9.

It is not necessary to include the separation mechanism in the apparatus or the separation mechanism may be comprised in the reverse mechanism instead. In particular, in the above-described apparatus 100, the separation mechanism and the reverse mechanism are separate and the separation mechanism is movable to allow the reverse mechanism to receive the single tube from the separation mechanism. However, the separation wheels 1 need not be present and the tubes may be directly fed to the reverse mechanism. In this embodiment, a separation mechanism (e.g. a groove sized to receive a single tube) may be comprised in the reverse mechanism and used to ensure that the reverse mechanism receives one tube at each time. Further, the tube orientation detection device 4 may be arranged with the reverse mechanism to detect the orientation of the tube received by the groove of the separation mechanism comprised in the reverse mechanism. The urging mechanism and the reject mechanism may also be arranged with the reverse mechanism.

Even with the presence of the separation wheels 1, the tube orientation detection device 4 need not be arranged with one of the separation wheels 1. The detection device 4 may be located anywhere as long as it is able to determine an orientation of the tube received by the reverse mechanism. For example, in the above-described apparatus 100, the detection device 4 is located at a separation wheel 1 and is configured to detect an orientation of the tube received in a groove of the separation wheel 1. Because the relative motion between the separation wheels 1 and the reverse wheels 2 is predetermined, such detection allows the determination of the orientation of the tube received by the reverse mechanism. In other embodiments, the detection device 4 can be arranged directly with the reverse mechanism (e.g. with one of the reverse wheels 2) to detect the orientation of the tube received by the reverse mechanism.

Also, although in the above-described apparatus 100, the reverse mechanism is configured to rotate either 45 degrees clockwise or 135 degrees anti-clockwise to move from the first position to the second position, the reverse mechanism can be configured to rotate by amounts different from that in the above-described apparatus 100.

Further, the urging mechanism need not be in the form of the linear up/down device 8 and the reject mechanism need not be in the form of the linear reject device 9. These mechanisms can be implemented using other types of devices as long as such devices are able to perform the same functions.

Although not preferred, the first and second tube grooves 11, 14 also need not be present and the separation mechanism, reverse mechanism and discharge mechanism can be placed nearer to each other to receive the tube directly from each other. In the above-described apparatus 100, the grooves of the reverse mechanism and the discharge mechanism are aligned or misaligned due to the alignment or misalignment of the grooves of the reverse mechanism with the second tube grooves 14, and this achieves the effect of preventing the discharge mechanism from receiving the tube until the reverse mechanism moves to the second position. In the embodiment without the tube grooves, the same effect can be achieved by having the grooves of the reverse mechanism and the grooves of the discharge mechanism aligned or misaligned relative to each other.

The invention claimed is:

1. An apparatus for arranging tubes configured to receive integrated circuit packages, the apparatus comprising:
    a reverse mechanism configured to receive a tube;
    a detection element configured to determine an orientation of the tube received by the reverse mechanism; and
    a discharge mechanism, the reverse mechanism being movable selectively between a first position which prevents the discharge mechanism from receiving the tube from the reverse mechanism and a second position which allows the discharge mechanism to receive the tube;
    wherein the movement of the reverse mechanism between the first position and the second position is dependent on the determined orientation of the tube,
    wherein the reverse mechanism is rotatable, and
    wherein rotation of the reverse mechanism in one direction from the first position to the second position maintains the orientation of the tube, and rotation of the reverse mechanism in the other direction from the first position to the second position changes the orientation of the tube.

2. An apparatus according to claim 1, further comprising a separation mechanism configured to ensure the receiving of a single tube by the reverse mechanism.

3. An apparatus according to claim 2, wherein the separation mechanism comprises at least one groove sized to receive a single tube.

4. An apparatus according to claim 3, further comprising an urging mechanism configured such that when a plurality of tubes are received by the at least one groove, the urging mechanism repeatedly urges the plurality of tubes away from the at least one groove until a single tube is received by the at least one groove.

5. An apparatus according to claim 3, further comprising a tube present detection device configured to detect if a tube has been received by the at least one groove.

6. An apparatus according to claim 5, wherein the detection element is configured to determine the orientation of the tube received by the at least one groove after the tube present detection device has detected that a tube has been received.

7. An apparatus according to claim 6, wherein the apparatus further comprises a reject mechanism configured to urge the tube out of the at least one groove if the detection element is unable to detect the orientation of the tube after the tube present detection device has detected that a tube has been received.

8. An apparatus according to claim 2, wherein the separation mechanism and the reverse mechanism are separate and wherein the separation mechanism is movable to allow the reverse mechanism to receive the single tube from the separation mechanism.

9. An apparatus according to claim 2, wherein the separation mechanism is comprised in the reverse mechanism.

10. An apparatus according to claim 1, wherein the reverse mechanism and the discharge mechanism comprise respective grooves for receiving the tube, and wherein the grooves of the reverse and discharge mechanism are misaligned when the reverse mechanism is in the first position and are aligned when the reverse mechanism is in the second position.

11. An apparatus according to claim 1, wherein the reverse mechanism is configured to rotate 45 degrees in the clockwise direction to maintain the orientation of the tube and 135 degrees in the anti-clockwise direction to change the orientation of the tube.

12. An apparatus according to claim 1, further comprising tube grooves configured to facilitate movement of the tube from the reverse mechanism to the discharge mechanism.

13. An apparatus according to claim 1, further comprising support structures with V-shaped openings to facilitate the apparatus to receive the tubes.

14. A method of arranging tubes configured to receive integrated circuit packages, the method comprising:
    receiving a tube with a reverse mechanism;
    determining an orientation of the received tube;
    moving the reverse mechanism selectively between a first position which prevents receiving of the tube from the reverse mechanism and a second position which allows receiving of the tube from the reverse mechanism;
    wherein the movement of the reverse mechanism between the first position and the second position is dependent on the determined orientation of the tube,
    wherein the reverse mechanism is rotatable, and
    wherein rotation of the reverse mechanism in one direction from the first position to the second position maintains the orientation of the tube, and rotation of the reverse mechanism in the other direction from the first position to the second position changes the orientation of the tube.

\* \* \* \* \*